July 4, 1933.    J. E. SMITH    1,917,071
APPARATUS FOR MAKING COFFEE
Filed May 1, 1930
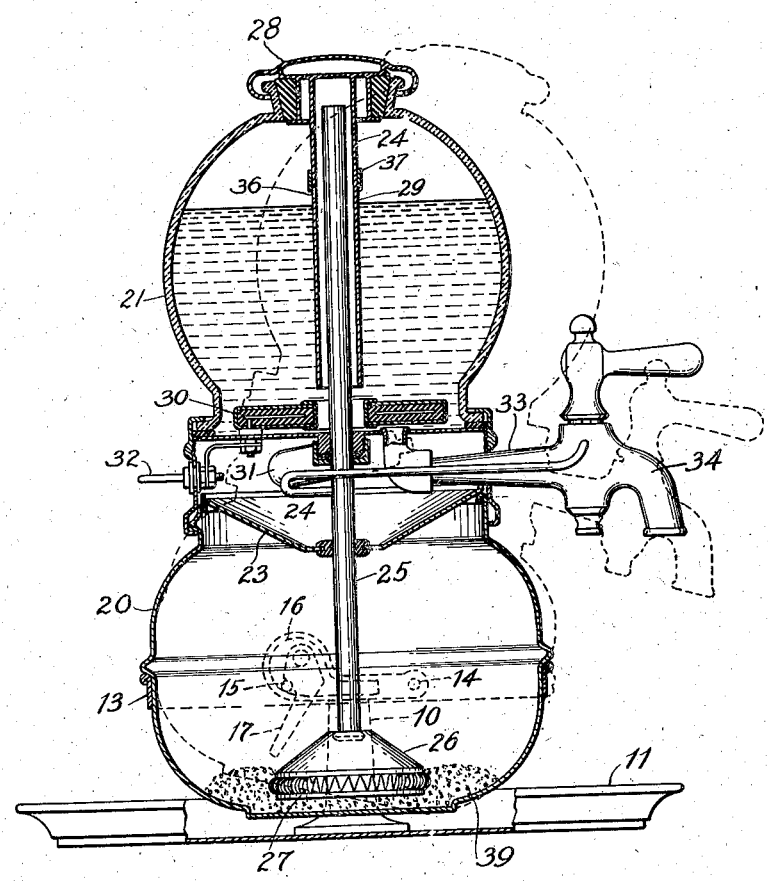
INVENTOR.
JOHN E. SMITH
BY
ATTORNEY.

Patented July 4, 1933

1,917,071

UNITED STATES PATENT OFFICE

JOHN E. SMITH, OF PLAINFIELD, NEW JERSEY

APPARATUS FOR MAKING COFFEE

Application filed May 1, 1930. Serial No. 448,833.

My invention relates to improvements in apparatus for making infusions of coffee, tea and the like, and has for an object to provide an infusing apparatus which will be automatic in its operation.

Recent scientific studies of coffee and coffee infusions have shown that in order to keep out undesirable oils from the infusion, it is essential that the water which contacts with the ground coffee be maintained below the boiling point and preferably above a temperature of 190° Fahrenheit. Furthermore, the period of contact should be of short duration and the infusion should be removed from the grounds as soon as it has been prepared.

In my copending application Serial No. 395,803, filed September 28, 1929, I describe an apparatus for carrying out the above named ideal conditions of preparing coffee and an object of the present invention is to provide an improvement on that disclosed in said copending application.

The coffee infusing apparatus described in said copending application comprises a pair of receptacles connected by a siphon. In one of the receptacles water is placed and in the other ground coffee. Heat is then applied to the first receptacle to generate vapor which exerts pressure on the water sufficient to start the siphon and cause transfer of the water to the second receptacle. This transfer results in a change of the center of gravity of the apparatus which is utilized to turn off the heat. Thereafter, the first receptacle acts as a condenser, producing a partial vacuum which will cause a reverse flow through the siphon, drawing the coffee infusion back into the first receptacle.

One of the drawbacks of the apparatus disclosed in said copending application is that for any given size of apparatus there is a lower limit to the quantity of coffee that can be made under ideal conditions. If, for instance, the apparatus is adapted to produce six cups of coffee, it cannot be used satisfactorily for one or two cups. The reason for this is that the air in the first receptacle plays a prominent part in starting the siphon, and hence the temperature at which the siphoning begins will be modified by variations in the air space, or, to put it differently, by variations in the quantity of water in said receptacle. When a small quantity of water is placed in the receptacle, there is a large volume of air trapped above the water which, for any given rise of temperature, will develop a higher pressure than will a smaller volume of trapped air. Hence, if there is too great an air space the water will start the siphon off before it has been heated to the necessary temperature and the infusion will be comparatively weak.

It is an object of my invention to provide an apparatus for preparing coffee infusions which will operate equally as well with small quantities of water as with large and which at the same time will carry out the ideal conditions of coffee making above referred to.

Another object of my invention is to provide, in an apparatus of the type described above, a means for adjusting the starting of the siphon.

These and other objects will appear in the following description of an embodiment of my invention and thereafter the novelty and scope of the invention will be pointed out in the claims.

In the accompanying drawing, I show a view, largely in vertical section, of my improved coffee infusing apparatus. This apparatus is very similar to that described in said copending application. It comprises a pair of standards 10 rising from and secured to a tray 11. (In the drawing only one of the standards is shown.) A supporting ring 13 is provided with trunnion pins 14 which are pivoted in the standards. These pins are parallel to, but spaced somewhat in advance of, a diametric axis of the ring, while to the rear of said axis is a pair of opposed pins 15 which project into a recess 16 formed in the inner face of each standard. The ring 13 may be tilted on the trunnion pins 14 as a center and the recess 16 limits the extent of such tilting by confining the scope of movement of the pins 15. A latch 17 engages the pin 15 and serves to hold the ring normally in the horizontal position shown in the drawing.

The ring 13 provides a support for a receptacle 20. Above this receptacle is a second receptacle 21. A diaphragm 23 in the receptacle 20 provides a valve chamber 24 below the receptacle 21. A tube 25 passes vertically into the receptacle 13 and is provided at its lower end with a flaring inverted funnel 26 which terminates close to the bottom wall of the receptacle 20. Over the mouth of this funnel is secured a filter 27 of cloth or other suitable material. The upper end of the tube 25 extends into the upper receptacle 21, terminating near the top of said receptacle. A stopper 28 which fits into the mouth at the top of the receptacle 21 is provided with a depending tube 29 which fits over the tube 25, with a certain amount of clearance between the two tubes, and extends to a point near the bottom of a receptacle 21. It will be observed, therefore, that the tubes 29 and 25 constitute the legs of a siphon connecting the two receptacles. Mounted within the receptacle 21 is an electric heating unit 30 which is connected through a suitable gravity valve 31 to a pair of electric terminals 32, whereby a socket plug may be attached to said terminals to supply current from a suitable source to the heating unit. The latter consists of electrical resistance wire embedded in a mass of clay or other heat-retaining material. The heating unit is suitably encased to protect it from the water or coffee in the receptacle 21. An outlet pipe 33 leads from the bottom of the receptacle 21 and is provided at its outer end with a stop cock 34.

The apparatus as so far described is similar to that already disclosed in said copending application. In the present apparatus, however, a small port 36 is formed in the tube 29 at a predetermined point therein, but near the top of the receptacle 21. A sleeve 37 is slidable along the tube 29 and may be adjusted to partly cover the port 36, thereby regulating the size of the opening.

The operation of the apparatus is as follows:

A certain amount of ground coffee is placed in the receptacle 20, as indicated at 39. The quantity of ground coffee will depend upon the number of cups of coffee to be made. In the upper receptacle 21 is introduced a quantity of water, preferably a little more than the actual number of cups of coffee that are to be made. The latch 17 is now swung clear of the pin 15 and the apparatus is tilted forward to the position shown in broken lines in the drawing. When thus tipped the gravity switch 31 closes and connects the heating unit 30 to a source of electrical energy. If the volume of water in the receptacle 21 is sufficient to submerge the port 36 the operation of the apparatus is the same as described in said copending application. The air trapped in the receptacle above the water is heated and exerts pressure on the water surface. When the water has been heated to the desired temperature the air pressure, augmented by vapor pressure from the heated water, will be sufficient to force the water up the tube 29 until it overflows into the tube 25. The water then siphons off into the lower receptacle 20. The siphoning is not disturbed when the water level in the receptacle 21 falls below and uncovers the port 36, because the latter is so closed by the column of water inside the tube 29. Also the port 36 is too small to permit any appreciable amount of air to enter therethrough into the siphon, and the siphoning will continue until practically all of the water in receptacle 21 has been transferred into the receptacle 20.

If a smaller volume of coffee is to be made and the water placed in the receptacle 21 does not submerge the port 36, the latter will serve as a vent for the air trapped in the receptacle until the water has been heated to a requisite temperature, when the port 36 will be unable to vent the air and vapor fast enough and sufficient pressure will be developed to start the siphon. As soon as the water has been forced up the tube 29 past the port 36 the latter will be closed and the siphoning will continue until the water level in the receptacle 21 falls below the lower end of the tube 29.

In either case, whether a large or a small volume of coffee is being made, the transfer of water from the upper receptacle into the lower one will shift the center of gravity of the two receptacles, and before the water has all been siphoned off the apparatus will swing on the trunnion pins 14 to the vertical position shown by full lines in the drawing, thereby opening switch 31 and cutting off the current supply to the heating unit 30. However, the heat stored in said unit will continue to generate air and vapor pressure until the lower end of tube 29 is uncovered.

The water entering the vessel 20 mixes with the ground coffee 39 to produce a coffee infusion. As the receptacle 21 cools off, it acts as a condenser producing a partial vacuum which draws the coffee infusion back from the receptacle 20 into the receptacle 21. The port 36 in no way interferes with the return flow into the receptacle 21.

The position of the port 36 will vary for different sizes of receptacles. The size of the port is also a factor in controlling the temperature at which the siphon will begin to function and it is for this reason that I provide the sleeve 37 to vary the cross-sectional area of the port. A tight fit is provided between the sleeve and the tube 29 so that the sleeve will remain at the desired adjustment, or once the adjustment is made the sleeve may be permanently secured at desired adjustment by any suitable means.

Having thus described my invention, what

I claim as new and desire to secure by Letters Patent is as follows:

1. In an apparatus of the character described, a pair of receptacles, a siphon connecting said receptacles, one of the receptacles being normally sealed, means for supplying heat to the sealed receptacle, a leg of the siphon extending into and opening near the bottom of the sealed receptacle, said leg having an orifice therein opening into the upper part of the sealed receptacle, a support on which the receptacles are mounted to oscillate, and means controlled by the position of the receptacles for turning said heat on and off.

2. In an apparatus of the character described, a pair of receptacles, a siphon connecting said receptacles, one of the receptacles being normally sealed, means for supplying heat to the sealed receptacle, a leg of the siphon extending into and opening near the bottom of the sealed receptacle, said leg having an orifice therein opening into the upper part of the sealed receptacle, means for adjusting the area of said orifice, a support on which the receptacles are mounted to oscillate, and means controlled by the positions of the receptacles for turning said heat on and off.

3. In an apparatus of the character described, a pair of receptacles, a siphon connecting said receptacles, one of the receptacles being normally sealed, an electric heating unit in the sealed receptacle, a gravity switch carried by the receptacles and controlling the supply of electric current to the heating unit, a leg of the siphon extending into and opening near the bottom of the sealed receptacle, said leg having an orifice therein opening into the upper part of the sealed receptacle, a support on which the receptacles are mounted to oscillate to and from normal position, said switch being open when the receptacles are in normal position and closed when the receptacles are oscillated out of normal position.

4. In an apparatus of the character described, a pair of receptacles, a siphon connecting said receptacles, one of the receptacles being normally sealed, an electric heating unit in the sealed receptacle, a gravity switch carried by the receptacle and controlling the supply of electric current to the heating unit, a leg of the siphon extending into and opening near the bottom of the sealed receptacle, said leg having an orifice therein opening into the upper part of the sealed receptacle, means for adjusting the area of said orifice, and a support on which the receptacles are mounted to oscillate to and from normal position, said switch being open when the receptacles are in normal position and closed when the receptacles are oscillated out of normal position.

5. In a coffee making apparatus, a closed receptacle for water, a container for ground coffee, a siphon connecting the receptacle and container, one leg of the siphon opening at its free end in the receptacle adjacent the bottom thereof and joining the other leg of the siphon at a point slightly above the highest possible level of water in the receptacle, and a port opening into the upper part of the receptacle from the first-named siphon leg near the top of the siphon.

6. In a coffee making apparatus, a closed receptacle for water, a container for ground coffee, said container being disposed beneath said receptacle, a siphon connecting the containers and having one leg thereof in said receptacle, said leg opening at its free end in the receptacle adjacent the bottom thereof and joining the other leg of the siphon at a point adjacent the top of the receptacle, the first-named leg being formed with a vent opening into the upper part of the receptacle.

7. In a coffee making apparatus, a closed receptacle for water, a container for ground coffee, said container being disposed beneath said receptacle, a siphon connecting the containers and having one leg thereof in said receptacle, said leg opening at its free end in the receptacle adjacent the bottom thereof and joining the other leg of the siphon at a point adjacent the top of the receptacle, the first-named leg being formed with a vent opening into the upper part of the receptacle, and means for heating the water in the receptacle.

8. In a coffee making apparatus, a closed receptacle for water, a container for ground coffee, a siphon connecting the receptacle and container, one leg of the siphon opening at its free end in the receptacle adjacent the bottom thereof and joining the other leg of the siphon at a point slightly above the highest possible level of water in the receptacle, and a port opening into the upper part of the receptacle from the first-named siphon leg near the top of the siphon, and means for regulating the size of said port.

In testimony whereof, I have signed this specification.

JOHN E. SMITH.